United States Patent Office 3,459,799
Patented Aug. 5, 1969

3,459,799
CARBONYL CONTAINING 1-METHYL-2-
BENZYL-HYDRAZINE COMPOUNDS
Hugo Gutmann, Reinach, Basel-Land, Roland Jaunin,
Basel, Ado Kaiser, Neu-Frenkendorf, and Paul Zeller,
Allschwil, Switzerland, assignors to Hoffmann-La
Roche Inc., Nutley, N.J., a corporation of New Jersey
No Drawing. Filed Mar. 9, 1964, Ser. No. 350,564
Claims priority, application Switzerland, Mar. 13, 1963,
3,169/63
Int. Cl. C07c 109/04
U.S. Cl. 260—558    8 Claims

ABSTRACT OF THE DISCLOSURE

Cytostatic 1-methyl-2-benzylhydrazine compounds having a carbonyl-containing substituent on the phenyl nucleus and intermediates therefor are described.

---

The present invention relates to novel compounds. In particular, the present invention relates to novel pharmaceutically useful 1-methyl-2-benzyl-hydrazine compounds wherein the phenyl nucleus of the benzyl moiety is substituted by a carbonyl-containing substituent of a particular character, as outlined below, as well as to novel intermediates and processes useful in the preparation of said compounds. More particularly, the novel pharmaceutically useful compounds of this invention are selected from the group consisting of compounds of the formula:

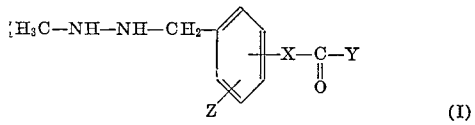

and acid addition salts thereof wherein X is selected from the group consisting of

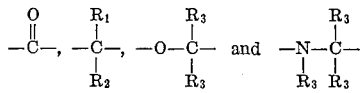

Y is selected from the group consisting of amino, lower alkylamino, di-lower alkylamino, ureido, lower alkyl-ureido, hydroxy-lower alkylamino and di(hydroxy-lower alkyl)amino; Z is selected from the group consisting of hydrogen, lower alkyl, halo-lower alkyl, amino, lower alkanoylamino, lower alkanoyl, ureido, carbamoyl, lower alkyl-ureido and lower alkyl-carbamoyl; $R_1$ is selected from the group consisting of hydrogen, hydroxy, halo, lower alkyl and lower alkoxy; $R_2$ is selected from the group consisting of hydrogen, halo, lower alkyl and lower alkoxy and each $R_3$ is selected from the group consisting of hydrogen and lower alkyl.

The term lower alkyl, as used herein, comprehends both straight and branched chain saturated hydrocarbon groups, such as methyl, ethyl, isopropyl, t.-butyl and the like. The term lower alkanoyl, similarly, represents acetyl or the like. The term haloalkyl, as used herein, includes compounds wherein one or more hydrogens on the parent lower alkyl moiety are replaced by halogen, for example, trifluoromethyl. The term halogen includes all four halogens, i.e., iodo, bromo, chloro and fluoro, but the latter two are preferred. The term hydroxy-lower alkyl comprehends hydroxy substituted lower alkyl moieties such as hydroxyethyl and the like; preferably those containing a single hydroxy substituent.

Representative compounds of this invention comprehended by Formula I above are, for example, the following:

1-[p-[carbamoylmethyl]benzyl]-2-methylhydrazine
1-[m-[carbamoylmethyl]benzyl]-2-methylhydrazine
1-[p-[(isopropylcarbamoyl)methyl]benzyl]-2-methylhydrazine
1-[m-[(isopropylcarbamoyl)methyl]benzyl]-2-methylhydrazine
1-[p-[α-carbamoylethyl]benzyl]-2-methylhydrazine
1-[p-[α-carbamoylisopropyl]benzyl]-2-methylhydrazine
1-[p-[α-carbamoylisopropyl]-m-ureido-benzyl]-2-methylhydrazine
1-[p-[(isopropylcarbamoyl)chloromethyl]benzyl]-2-methylhydrazine
1-[p-[(β-hydroxyethylcarbamoyl)methyl]benzyl]-2-methylhydrazine
1-[p-[(isopropylcarbamoyl)methoxy]benzyl]-2-methylhydrazine
1-[p-[(t.-butylcarbamoyl)methyl]benzyl]-2-methylhydrazine
1-[p-[carbamoyl-dichloromethyl]benzyl]-2-methylhydrazine
1-[p-[(isopropylcarbamoyl)carbonyl]benzyl]-2-methylhydrazine
1-[p-[(isopropylcarbamoyl)carbonyl]-m-ureido-benzyl]-2-methylhydrazine
1-[p-[carbamoyl-dimethoxymethyl]benzyl]-2-methylhydrazine
1-[p-[(isopropylcarbamoyl)methoxymethyl]benzyl]-2-methylhydrazine
1-[p-[(isopropylcarbamoyl)hydroxymethyl]benzyl]-2-methylhydrazine
1-[p-[carbamoylmethoxy]benzyl]-2-methylhydrazine
1-[p-[(isopropylcarbamoyl)methylamino]benzyl]-2-methylhydrazine
1-[p-[allophanoylmethyl]benzyl]-2-methylhydrazine
1-[p-[(carbamoyl)methyl]-m-[trifluoromethyl]benzyl]-2-methylhydrazine
1-[p-[(carbamoyl)methyl]-m-[acetylamino]benzyl]-2-methylhydrazine
1-[p-[(isopropylcarbamoyl)methyl]-m-ureido-benzyl]-2-methylhydrazine
1-[p-[(allophanoyl)methyl]-m-carbamoyl-benzyl]-2-methylhydrazine
1-[m-[(isopropylcarbamoyl)methyl]-p-[isopropylcarbamoyl]benzyl]-2-methylhydrazine A preferred subclass of compounds of Formula I are those of the formula:

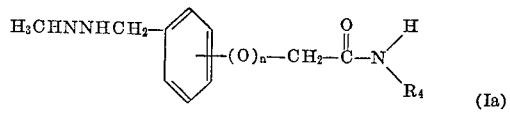

and acid addition salts thereof where $n$ is a whole integer from 0 to 1 and $R_4$ is selected from the group consisting of hydrogen, lower alkyl, hydroxy-lower alkyl and ureido.

Especially preferred compounds of Formulae I and Ia are those compounds of Formula I in which X represents methylene (i.e., —$CH_2$—), Y represents amino, lower alkylamino (especially isopropylamino) or di-lower alkyl-amino and Z represents hydrogen. Exemplary thereof is, for example, 1-[p-[(isopropylcarbamoyl)methyl]benzyl]-2-methylhydrazine hydrochloride.

The compounds of Formula I form acid addition salts. More particularly, they form pharmaceutically acceptable acid addition salts with both pharmaceutically acceptable organic and inorganic acids, for example, hydrohalic acids such as hydrochloric acid, hydrobromic acid, hydroiodic acid, other mineral acids such as sulphuric acid, phosphoric acid and the like, and organic acids such as tartaric acid, citric acid, oxalic acid, camphor-sulphonic acid, ethane-sulphonic acid, toluene-sulphonic acid, mandelic acid and the like. Especially preferred pharmaceutically acceptable acid addition salts are the hydrohalides (especially the hydrochlorides and hydrobromides) and the oxalates. The acid addition salts are preferably manufactured by treatment of the hydrazine derivative in an inert solvent with the appropriate acid. Acid addition salts which are not pharmaceutically acceptable acid addition salts can be converted into pharmaceutically acceptable acid addition salts via a conventional metathetic reaction whereby the anion of the former is exchanged for the anion of the latter.

The compounds of Formula I can be prepared from compounds of the formula:

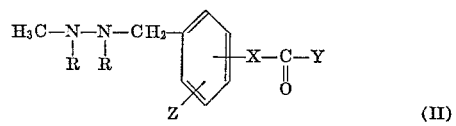

(II)

wherein X, Y and Z have the same meaning as above and R is a protecting moiety selected from the group consisting of arylalkoxycarbonyl and lower alkanoyl, via a treatment effecting removal of the moieties denoted by R and, if desired, by subsequently converting the so-obtained hydrazine compound into an acid addition salt or from compounds of the formula:

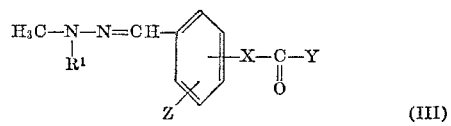

(III)

wherein X, Y and Z have the same meaning as above, and $R^1$ is selected from the group consisting of hydrogen, arylalkoxycarbonyl and lower alkanoyl, via hydrogenation followed, in the cases where $R^1$ is other than hydrogen, by splitting off of the moiety represented by $R^1$, and, if desired, by subsequently converting the so-obtained hydrazine compound into an acid addition salt.

The term arylalkoxycarbonyl, as used herein, is exemplified by compounds where aryl is, for example, phenyl and the alkoxy moiety is lower alkoxy, for example, carbobenzoxy (also designated benzyloxycarbonyl).

The compounds of Formulae II and III are novel compounds within the scope of this invention and can be synthesized by a variety of methods.

For example, starting compounds of Formula II in which X is a carbonyl moiety

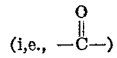

can be prepared as follows:

(a) 1,4-bis-dichloromethylbenzene can be converted into ethyl 4-chloromethyl-benzyl acetate via treatment with sodium acetate in glacial acetic acid. The latter compound, via treatment with aqueous potassium cyanide, is converted into p-hydroxymethyl-phenyl-acetonitrile which, in turn, can be reacted with p-nitroso dimethylaniline whereby there is formed an azomethine compound which yields, upon treatment with hydrochloric acid, p-hydroxymethyl-benzoyl cyanide. This latter compound, via saponification and treatment with thionyl chloride can be converted into p-chloromethylphenyl glyoxylyl chloride, which in turn, is reacted with an appropriate amino compound to yield a carbamoyl- (or allophanoyl-) carbonyl-benzyl chloride. The condensation of the latter compound with the sodium salt of a 1,2-bis-aryloxycarbonyl- (or lower alkanoyl-) 2-methylhydrazine yields the desired [carbamoyl- (or allophanoyl-) carbonyl-benzyl]methylhydrazine intermediate of Formula II wherein the hydrazine nitrogen atoms bear protecting moieties, for example, a compound such as 1,2 - bis(benzyloxycarbonyl) - 1 - [p-[(isopropylcarbamoyl)carbonyl]benzyl] - 2 - methylhydrazine.

Starting materials of Formula III in which X is a carbonyl moiety can be prepared, for example, as follows:

(b) The carbamoyl- (or allophanoyl-) carbonyl-benzyl chloride obtained according to (a) can be converted via the Sommelet reaction into the corresponding carbamoyl- (or allophanoyl-) carbonyl-benzaldehyde, which, via condensation with methyl hydrazine (if desired, bearing a protecting group on the methylated nitrogen atom) can be converted into the corresponding [carbamoyl- (or allophanoyl-) carbonyl-benzyl]methylhydrazone intermediate of Formula III containing, if desired, a protecting group on the methylated nitrogen atom, for example, a compound such as 2-benzyloxycarbonyl-1-[p-[(isopropylcarbamoyl)carbonyl]benzyl]-2-methylhydrazone.

Compounds of Formula II in which X represents a hydroxy methylene moiety

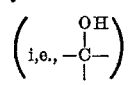

can be prepared, for example, as follows:

(c) p-Hydroxymethyl benzaldehyde, via treatment with hydrogen cyanide, can be converted into the corresponding cyanohydrin which is saponified in the presence of concentrated aqueous hydrochloric acid to p-chloromethyl-mandelic acid. This compound is then lower alkanoylated via treatment with a lower alkanoyl anhydride such as acetic anhydride and then converted into the corresponding acid chloride via treatment with thionyl chloride. The so-obtained acid chloride is then reacted with a suitable amine to yield the corresponding carbamoyl- (or allophanoyl-) lower alkanoyloxy-methyl-benzyl chloride, which is then condensed with the sodium salt of a 1,2-bis-aryloxycarbonyl- (or lower alkanoyl-) 2-methylhydrazine. The condensation product can be subjected to mild alkaline conditions whereby there is obtained the desired intermediate of Formula II containing protecting groups on the hydrazine nitrogen atoms, i.e., a [carbamoyl- (or allophanoyl-) hydroxymethyl-benzyl]-methylhydrazine such as, for example, 1,2,-bis(benzyloxycarbonyl) - 1-[p - [(isopropylcarbamoyl)hydroxymethyl] benzyl]-2-methylhydrazine.

(d) The same compounds can also be prepared from the carbamoyl- (or allophanoyl-) carbonyl-benzyl chlorides obtained according to (a) proceeding, for example, as follows:

The carbamoyl- (or allophanoyl-) carbonyl-benzyl chloride is condensed with the sodium salt of a 1,2-bis-lower alkanoyl-2-methylhydrazine and the condensation product catalytically reduced into the desired lower alkanoyl substituted [carbamoyl- (or allophanoyl-) hydroxymethyl-benzyl]methylhydrazine, for example, a compound such as 1,2-bis-acetyl-1-[p-[(isopropylcarbamoyl)hydroxymethyl]benzyl]-2-methylhydrazine.

The starting materials of Formula II in which X is halomethylene

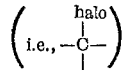

can be prepared, for example, as follows:

(e) The 1,2-bis-aryloxycarbonyl- (or lower alkanoyl-) 1-[p-[(carbamoyl or allophanoyl-)hydroxymethyl]benzyl] - 2 - methylhydrazine obtained according to (c) and (d) can be converted, via treatment with a thionyl halide, into the desired [carbamoyl (or allophanoyl-) halomethyl-benzyl]methylhydrazine which, if desired, bears protecting groups on the hydrazine nitrogen atoms, for example, a compound such as 1,2-bis(benzyloxycarbonyl)-1-[p-[(isopropylcarbamoyl)chloromethyl]benzyl] - 2 - methyl-hydrazine.

Starting materials of Formula II in which X is methylene can be prepared, for example, as follows:

(f) 1 mole of 1,4-bis(chloromethyl)benzene can be condensed with 1 mole of the sodium salt of a 1,2-bis (aryloxycarbonyl or lower alkanoyl)-2-methylhydrazine yielding a 1,2-bis(aryloxycarbonyl or lower alkanoyl)-1-[p-chloromethyl-benzyl]-2-methylhydrazine. The latter compound, via treatment with potassium cyanide, is converted into a 1,2-bis(aryloxycarbonyl or lower alkanoyl)-1-[p-cyanomethyl-benzyl]-2-methylhydrazine, the cyano group of which, via treatment with alcoholic hydrogen chloride and then with alcoholic alkali, can be converted into a carboxy moiety. Then, by treatment with thionyl chloride, there is obtained a 1,2-bis(aryloxycarbonyl or lower alkanoyl) - 1 - (chlorocarbonyl-methyl-benzyl)-2-methylhydrazine which, by treatment with a suitable amine, can be converted into the desired [carbamoyl- or allophanoyl-) methyl-benzyl]methylhydrazine, for example, a compound such as 1,2-bis(benzyloxycarbonyl)-1 - [p-[(isopropylcarbamoyl)methyl]benzyl]-2-methylhydrazine.

Starting materials of Formula II in which X is a lower alkyl-substituted methylene group, can be prepared, for example, as follows:

(g) p-Hydroxymethyl-phenyl-acetonitrile was saponified with alkali to p-hydroxymethyl-phenyl-acetic acid, which, via treatment with acetic anhydride, was converted to the acetate. The latter compound was esterified with ethyl alcohol, yielding ethyl p-acetoxymethyl-phenyl-acetate. This compound was converted in the presence of ammoniacal sodium with a suitable lower alkyl halide into ethyl p-acetoxymethyl-α- (or α,α-di-) lower alkylphenyl-acetate. The ester was saponified, and, via treatment with thionyl chloride, converted into the corresponding p-chloromethyl-phenyl-α- (or α,α-di-) lower alkylacetyl chloride. Reaction with an appropriate amine gives corresponding carbamoyl- (or allophanoyl-) α- (or α,α-di-) lower alkyl-methyl-benzyl chloride which, via condensation with the sodium salt of a 1,2-bis-aryloxycarbonyl- (or lower alkanoyl-) 2-methylhydrazine, gives the desired [carbamoyl- (or allophanoyl-) α- (or α,α-di-) lower alkylmethyl-benzyl]methylhydrazine bearing protecting groups on the hydrazine nitrogen atoms, for example, a compound such as 1,2-bis(benzyloxycarbonyl)-1-[p-[(isopropylcarbamoyl)isopropyl]benzyl]-2-methylhydrazine.

Starting compounds of Formula III in which X is a lower alkyl-substituted methylene group can be prepared, for example, as follows:

(h) The carbamoyl- (or allophanoyl-) α- (or α,α-di-) lower alkyl-methyl-benzyl chloride obtained according to (g) was converted by the Sommelet reaction into the corresponding carbamoyl-methyl-lower alkyl-methyl-benzaldehyde. The latter compound was then condensed with methylhydrazine, if desired, bearing a protecting group on the methylated nitrogen atom, to give a [carbamoyl- (or allophanoyl-) α- (or α,α-di-) lower alkylmethyl-benzyl]methylhydrazone bearing, if desired, a protecting group, for example, compounds such as 2-benzyloxycarbonyl - 1 - [p-[(isopropylcarbamoyl)isopropyl]benzyl]-2-methylhydrazone.

Starting materials of Formula III in which X is a lower alkoxy-substituted methylene group can be prepared, for example, as follows:

(i) p-Chloromethyl-mandelic acid, via treatment with ethanolic hydrochloric acid was converted into ethyl p-chloromethyl-mandelate and this compound, via the Sommelet reaction, was then converted into ethyl p-formyl-mandelate. The ester was saponified, treated with thionyl chloride, and then converted with an appropriate amine into the corresponding p-carbamoyl- (or allophanoyl-) chloromethyl-benzaldehyde. Via treatment with an alkali metal lower alcoholate, the halo atom is replaced by the desired lower alkoxy group. The thus-formed p-carbamoyl- (or allophanoyl-) lower alkoxymethylbenzaldehyde can be condensed with methylhydrazine which, if desired, bears a protecting group on the methylated nitrogen atom, to give a [carbamoyl- (or allophanoyl-) lower alkoxymethylbenzyl]methylhydrazone, if desired, bearing a protecting group, for example, a compound such as 2-benzyloxycarbonyl-1-[p-[(isopropylcarbamoyl) methoxymethyl]benzyl]-2-methylhydrazone.

Compounds of Formula II in which X is an

prepared, for example, as follows:

(k) p-Hydroxy-benzaldehyde is condensed under alkaline conditions with an appropriate haloacetamide, thereby forming corresponding p-[carbamoyl- (or allophanoyl- methoxy]benzaldehyde. The aldehyde group of this compound is then reduced via treatment with sodium borohydride and the so-formed hydroxy group replaced by chlorine via treatment with thionyl chloride. The so-obtained p-[carbamoyl- (or allophanoyl-) methoxy]benzyl chloride is then condensed with the sodium salt of a 1,2-bis-aryloxycarbonyl- (or lower alkanoyl-) 2-methylhydrazine which, if desired, bears protecting groups on the nitrogen atoms, to give a [carbamoyl- (or allophanoyl) methoxy-benzyl-methylhydrazine, for example, a compound such as 1,2-bis(benzyloxycarbonyl)-1-[p-[(isopropylcarbamoyl)methoxy]benzyl]-2-methylhydrazine.

The same starting compounds can also be prepared according to the following methods:

(l) p-benzyloxy-benzyl chloride is reacted with the sodium salt of a 1,2-bis-lower alkanoyl-2-methylhydrazine to give a 1,2-bis(lower alkanoyl) - 1 - (p-benzyloxy-benzyl)-2-methylhydrazine which is then catalytically hydrogenated. The so-obtained 1,2-bis(lower alkanoyl)-1-(p-hydroxy-benzyl)-2-methylhydrazine is then reacted with an appropriate haloacetamide, yielding the desired lower alkanoyl-substituted [carbamoyl- (or allophanoyl-) methoxybenzyl]-methylhydrazine, for example, a compound such as 1,2-bis-acetyl-1-[p-[(isopropylcarbamoyl) methoxy]benzyl]-2-methylhydrazine.

Starting compounds of Formula II in which X is an

moiety can be prepared, for example, as follows:

(m) An N-monosubstituted-p-amino - benzaldehyde is reacted with an appropriate haloacetamide and the aldehyde group is then covnerted into a chloromethyl group. The so-obtained compound is then condensed with the sodium salt of a 1,2-bis-aryloxycarbonyl- (or lower alkanoyl-) 2-methylhydrazine to give the desired compound of Formula II, bearing protecting groups on the hydrazine nitrogen atoms, that is a [carbamoyl- (or allophanoyl-) (if desired, N-substituted-methylamino)benzyl]methylhydrazine bearing protecting groups on the hydrazino nitrogen atoms, for example, a compound such as, 1,2-bis(benzyloxycarbonyl)-1-[p-[(isopropylcarbamoyl)methylamino]benzyl]-2-methylhydrazine.

The same starting compounds can also be prepared by the following methods:

(n) p-Nitrobenzyl chloride or p-phenylazobenzyl chloride is reacted with the sodium salt of a 1,2-bis-lower alkanoyl-2-methylhydrazine and the so-obtained compound is catalytically hydrogenated. The so-formed 1,2-bis-lower alkanoyl-1-(p-aminobenzyl)-2-methylhydrazine is reacted in a 1:1 molar ratio with an appropriate haloacetamide, yielding the desired lower alkanoyl-substituted [carbamoyl- (or allophanoyl-) methylamino-benzyl]methylhydrazine, for example a compound such as 1,2 - bis - acetyl - 1 - [p - [(isopropylcarbamoyl)methylamino]benzyl]-2-methylhydrazine.

The free hydrogen of the amino group of a compound formed by methods (m) and (n) can also be substituted by lower alkyl. Such N-lower alkyl-substituted compounds can be obtained according to the above methods, by condensing the above described p-aminobenzyl derivatives with an aldehyde, and reducing the so-obtained Schiff's base prior to the reaction with the haloacetamide.

The protecting moiety represented by R in Formula II and R¹ in Formula III can be split off in manners known per se, for example, by hydrogenolysis or hydrolysis, thereby leading to the end-product compounds of Formula I.

For example, the hydrogenolysis can suitably be carried out with catalytically activated hydrogen. Palladium black is preferably used as the catalyst.

The hydrolysis can be carried out in alkaline or acid medium; for example, it can be carried out in the presence of a dilute mineral acid such as a hydrohalic acid, for example, hydrochloric acid, or via hydrohalic acid in the presence of a lower carboxylic acid, for example, via hydrogen bromide in glacial acetic acid, or in the presence of dilute alkali, and at room temperature or elevated temperatures. The conditions of choice depend on the other substituents on the molecule, and will be readily determined by one skilled in the art.

As will be apparent to those skilled in the art, in certain circumstances, the procedures effecting removal of the protecting groups represented by R in the formulae above, will simultaneously effect conversion of the substituents X, Y and Z into their desired end form.

The hydrazones of Formula III can be converted into the desired end products of Formula I according to methods known per se, for example, via hydrogenation, advantageously in the presence of a noble metal catalyst such as platinum oxide, palladium/carbon or the like, suitably in an inert solvent, for example, a lower alkanol, such as methanol or ethanol.

The end product compounds of this invention (i.e., the compounds of Formula I and their pharmaceutically acceptable acid addition salts) are pharmaceutically useful. More particularly, they are useful as cytostatic agents. They inhibit the growth of transplantable tumors in mice and rats, for example, the Walker-tumor of the rat, the Ehrlich carcinoma of the mouse, the Ehrlich-ascites carcinoma of the mouse, and the like.

The compounds of the invention can be administered internally, for example, enterally or parenterally, with dosage adjusted to individual requirements. They can be administered in conventional pharmaceutical forms, for example, they can be administered in admixture with conventional organic or inorganic pharmaceutical carriers suitable for enteral or parenteral administration, for example, water, gelatin, starch, magnesium stearate, talc, vegetable oils, gums, polyethylene glycols, vaseline and the like. The pharmaceutical preparations can be in conventional solid forms such as tablets, dragees, suppositories, capsules and the like, or in conventional liquid forms such as solutions, suspensions, emulsions or the like. They can be submitted to conventional pharmaceutical expedients, for example, sterilization, and they can contain pharmaceutical adjuvants such as preservatives, stabilization agents, wetting agents, emulsifying agents, salts for adjustment of osmotic pressure or buffers. The pharmaceutical preparations can also contain other therapeutically valuable substances.

The following examples are illustrative, but not limitative of the invention. All temperatures are stated in ° C.

EXAMPLE 1

22 g. of 1,2-bis(benzyloxycarbonyl)-1-[p-(carbamoylmethyl)benzyl]-2-methyl-hydrazine was dissolved in 25 ml. of glacial acetic acid and mixed with 75 ml. of a 33% solution of hydrogen bromide in glacial acetic acid. The resulting mixture was permitted to stand for four hours at room temperature. The precipitated crystals which resulted were then filtered off and washed with glacial acetic acid and with ether. Recrystallization from ethanol yielded 1-[p-(carbamoylmethyl)benzyl]-2-methyl-hydrazine hydrobromide; M.P. 192–194°.

The starting material used above in this example was prepared as follows:

A solution of 96 g. of 1,2-bis(benzyloxycarbonyl)-1-(p-formyl-benzyl)-2-methyl-hydrazine in 200 ml. of bis(2-methoxyethyl)ether was mixed, with concurrent cooling by an ice bath, with a solution of 4.25 g. of sodium borohydride in 10 ml. of water and the resulting mixture was then stirred for 1 hour. It was then poured into 2 l. of water and the so-obtained mixture acidified with hydrochloric acid and then extracted with ether. The ether extract was washed with water, sodium hydroxide and again with water, then dried and concentrated. The so-obtained oil was dissolved in 200 ml. of absolute ether and with 17 ml. of thionyl chloride, heated under reflux for 3 hours. The 1,2-bis(benzyloxycarbonyl)-1-(p-chloromethyl-benzyl)-2-methyl-hydrazine thus formed may also be prepared in the following way: 35 g. of 1,4-bis-chloromethylbenzene in 100 ml. of abs. dimethyl formamide is warmed at 10° for one hour with a solution of 36.7 g. of the sodium salt of 1,2-bis-benzyloxycarbonyl-2-methyl-hydrazine. The dimethyl formamide is distilled off under reduced pressure. The oily residue is adsorbed on silica gel (Merck grain size 0.2–0.5 mm.). By elution with benzene 1,2-bis(benzyloxycarbonyl)-1-(p-chloromethyl-benzyl)-2-methyl-hydrazine is obtained. 22 g. of this product were stirred at room temperature for 20 hours in a solution of 10 g. of sodium cyanide and 300 ml. of dimethylformamide. The stirred solution was then poured into 5 l. of water, extracted with ether and the ether extract washed with water, dried and concentrated, yielding as a yellowish oil, 1,2-bis(benzyloxycarbonyl)-1-[p-(cyanomethyl) - benzyl]-2-methyl-hydrazine. The so-obtained product was then converted with an alkaline solution of hydrogen peroxide into the desired starting material, 1,2-bis(benzyloxycarbonyl)-1-[p - (carbamoylmethyl)benzyl] - 2-methyl-hydrazine.

EXAMPLE 2

12.8 g. of 1,2-bis(benzyloxycarbonyl)-1-[p-[(tert.-butylcarbamoyl)methyl]benzyl]-2 - methyl-hydrazine was dissolved in 100 ml. of methanol and following the addition of 2 g. of 5 percent palladium-carbon-catalyst, shaken in a hydrogen atmosphere. After the absorption of the calculated amount hydrogen, the catalyst was filtered off, and the filtrate treated with one equivalent of ethanolic hydrochloric acid and concentrated to about 30 ml. Via the addition of 250 ml. of absolute ether, there was obtained a crystalline material which was filtered off and recrystallized from methanol/ether yielding 1-[p-[(tert.-butylcarbamoyl)methyl]benzyl]-2 - methyl-hydrazine hydrochloride melting at 149–151°.

The starting material used above in this example was prepared as follows:

9.3 g. of 1,2-bis(benzyloxycarbonyl)-1-[p-(cyanomethyl)benzyl]-2-methylhydrazine prepared in Example 1 was dissolved in a mixture of 11 g. of glacial acetic acid and 2.5 g. of tertiary butanol. While cooling in an ice bath, 3.1 g. of concentrated sulfuric acid was added to the mixture, which was then permitted to stand for 20 hours at room temperature and then poured into ice water, extracted with ether, the ether extract was washed with water, then sodium hydroxide and again with water. It was then dried and concentrated yielding as a yellow oil 1,2-bis(benzyloxycarbonyl) - 1 - [p - [(t. - butylcarbamoyl)methyl]benzyl] - 2 - methylhydrazine.

EXAMPLE 3

24 g. of 1,2-bis(benzyloxycarbonyl)-1-[p-(carbamoylmethoxy)benzyl]-2-methylhydrazine was dissolved in 25 ml. of glacial acetic acid and mixed with 100 ml. of a 33% solution of hydrogen bromide in glacial acetic acid. The reaction mixture was permitted to stand for 2 hours at room temperature and the crystals which separated were filtered off. washed with ether and recrystallized from methanol/ether, yielding 1-[p-(carbamoylmethoxy)benzyl]-2-methyl-hydrazine hydrobromide, melting at 184–186°.

The starting material used above in this example was prepared as follows:

80 g. of potassium p-formyl-phenolate was dissolved with 47.2 g. of chloroacetamide in 200 ml. of dimethylformamide, and the resulting mixture heated under reflux for 2 hours. The reaction mixture was then permitted to cool and poured into 1200 ml. of ice water. The p-carbamoylmethoxy-benzaldehyde which precipitated was filtered off, washed, dried in a desiccator and then following suspension in 340 ml. of methanol, at a temperature between 0 and 5°, there was added a solution of 7.6 g. of sodium borohydride in 21 ml. of water. After the addition, the temperature rose and when it reached 15° C., 140 ml. of water was added. The solution thus obtained was then neutralized via the addition of 2 N hydrochloric acid. The methanol was then distilled off under reduced pressure in a rotary evaporator. The p-carbamolymethoxy-benzyl alcohol which separated was isolated, washed with water and dried in a desiccator. The slightly yellow colored compound (M.P. 120–122°) was then treated with a solution of 22 ml. of thionyl chloride in 65 ml. of chloroform, and heated under reflux for one hour. Then, half of the chloroform originally introduced was distilled off. The concentrate was then cooled and p-carbamoylmethoxy-benzyl chloride separated in the cold. After recrystallization from chloroform, it melted at 141–143°.

A solution of 15.5 g. of 1,2-bis(benzyloxycarbonyl)-methyl-hydrazine in 50 ml. of dimethylformamide was introduced dropwise into a suspension of 1.25 g. of sodium hydride in 25 ml. of dimethylformamide. During this addition, the temperature was maintained at a maximum of 20°. After the further addition of 10 g. of p-carbamoylmethoxy-benzyl chloride in 55 ml. of dimethylformamide, the reaction mixture was heated for 3 hours at 80°. Then most of the dimethylformamide was distilled off under reduced pressure in a rotary evaporator, the reaction mixture then poured into ice water and exhaustively extracted with methylene chloride. The methylene chloride eluate was then separated, washed with water, dried and evaporated, yielding as an almost colorless oil 1,2-bis(benzyloxycarbonyl) - 1 - [p - (carbamoylmethoxy)benzyl] - 2-methylhydrazine.

EXAMPLE 4

25 g. of 1,2-bis(benzyloxycarbonyl)-1-[p-[(isopropylcarbamoyl)methoxy]benzyl] - 2 - methylhydrazine was dissolved in 400 ml. of absolute methanol and hydrogenated in the presence of 2.5 g. of palladium-carbon (5 percent) at room temperature and atmospheric pressure. After the uptake of hydrogen (1.9 l.) had ceased, the catalyst was filtered off under a nitrogen atmosphere. The filtrate was then concentrated to ca. 100 ml., and mixed with 50 ml. of 1 N methanolic hydrochloric acid and with 500 ml. absolute ether. The crystalline 1-[p-[(isopropylcarbamoyl)methoxy]benzyl] - 2 - methylhydrazine hydrochloride which precipitated, was separated, washed with ether and, after recrystallization from methanol/ether, melted at 146–148°.

The starting material used above in this example was prepared as follows:

A solution of 80 g. of potassium p-formyl-phenolate and 68 g. of N-isopropyl-chloroacetamide in 200 ml. of dimethylformamide was heated under reflux for two hours. The reaction mixture was permitted to cool and then poured into 1.5 l. of ice water. The p-[(isopropylcarbamoyl)methoxy]benzaldehyde which separated was taken up in a mixture of methylene chloride-ethyl ether (1:9). The eluate was washed with water, dried and concentrated. The oily residual aldehyde which remained after the solvent was evaporated was, in 300 ml. of methanol at a temperature of 20–25°, mixed with a solution of 10 g. of sodium borohydride in 30 ml. of water. The mixture was then stirred at room temperature for 1 hour, neutralized with 2 N hydrochloric acid and concentrated under reduced pressure in a rotary evaporator. The concentrate was then extracted with methylene chloride and the eluate dried, concentrated and left standing in the cold, whereupon the residual, oily p-[(isopropylcarbamoyl)methoxy]-benzyl alcohol crystallized. It was dissolved in 230 ml. of chloroform, and the solution mixed with 25 ml. of thionyl chloride in 35 ml. of chloroform and then heated under reflux for 1 hour. The reaction mixture was concentrated to dryness under reduced pressure and the crystals dissolved in a mixture of ether/methylene chloride (3:1). The eluate was shaken with water, dried and evaporated, yielding p-[(isopropylcarbamoyl)methoxy]-benzyl chloride which, upon recrystallization from ether/hexane melted at 94–96°.

In accord with the procedure described in Example 3, 12.1 g. of p-[(isopropylcarbamoyl)methoxy]benzyl chloride, in the presence of 1.25 g. of sodium hydride, was converted, with 15.5 g. of 1,2-bis(benzyloxycarbonyl) methylhydrazine into 1,2 - bis(benzyloxycarbonyl)-1-[p-[(isopropylcarbamoyl)methoxy]benzyl] - 2 - methylhydrazine which separated as an almost colorless oil.

EXAMPLE 5

24.2 g. of 1,2 - bis(benzyloxycarbonyl)-1-[p-[(isopropylcarbamoyl)methyl]benzyl] - 2 - methylhydrazine was mixed with 150 ml. of a 33% solution of hydrogen bromide in glacial acetic acid. The mixture, with occasional agitation, was then permitted to stand for 14 hours at room temperature. The crystals of 1-[p-[(isopropylcarbamoyl)methyl]benzyl] - 2 - methylhydrazine hydrobromide which separated were recrystallized several times from methanol/ether yielding colorless crystals which melted at 197° (dec.).

The starting material used above in this example was prepared as follows:

A suspension of 6.8 g. of sodium hydride in 140 ml. of absolute dimethylformamide was, with stirring, introduced into a solution of 89.5 g. of $N^1,N^2$-dicarbobenzoxymethylhydrazine in 280 ml. of dimethylformamide. To the so-obtained solution of the sodium salt of $N^1,N^2$-dicarbobenzoxymethylhydrazine, there was added dropwise with brisk stirring, in the course of 30 minutes at 80°, a solution of 60.3 g. of ethyl (p-chloromethylphenyl)acetate in 140 ml. of absolute dimethylformamide. The so-obtained mixture was then stirred for a further 30 minutes at 80°, cooled and neutralized with several drops of glacial acetic acid. The dimethylformamide was then distilled off at 10 torr.

The oily residue so-obtained was then partitioned between 1500 ml. of water and 500 ml. of methylene chloride. The methylene chloride eluate was separated, and the aqueous phase was twice extracted, each time with 300 ml. of methylene chloride. The combined methylene chloride eluates were then washed several times with 500 ml. of water, dried with sodium sulfate and concentrated under reduced pressures. The oily residue was dissolved in 900 ml. of absolute methanol and mixed with a solution of 16 g. of potassium hydroxide and 50 ml. of water. The reaction mixture was then permitted to stand for 16 hours at 4°, after which it was diluted with 300 ml. of water, and the methanol distilled off at 10 torr. To the aqueous solution there was then added an additional 700 ml. of water and then, to remove the unsaponified part, it was twice extracted with 250 ml. of ethyl acetate.

The aqueous phase was separated, acidified via the addition of concentrated aqueous hydrochloric acid and extracted once with 1000 ml. of ethyl acetate and then twice with, each time, 500 ml. of ethyl acetate. The combined ethyl acetate eluates were repeatedly shaken with water until neutral, then dried with sodium sulfate and concentrated at 10 torr. The oily residue was taken up in benzene and adsorbed on 1.5 kg. of Silicagel ("Merck," average particle size 0.2–0.5 mm.). Elution with a benzene/ether 8:2 mixture yielded 1,2-bis(benzyloxycarbonyl)-1-(p-carboxymethyl-benzyl) - 2-methylhydrazine which was obtained as a nearly colorless oil upon removal of the solvent mixture by distillation.

A mixture of 21 g. of 1,2-bis(benzyloxycarbonyl)-1-(p-carboxymethyl-benzyl)-2-methylhydrazine and 210 ml. of thionyl chloride was heated under reflux for 2½ hours. The clear, light yellow solution was concentrated at 10 torr. and, in order to remove excess thionyl chloride, dissolved 3 times, each time in 100 ml. of benzene and concentrated.

The residual, oily acid chloride was processed without further purification, as follows:

22 g. of 1,2-bis(benzyloxycarbonyl)-1-(p-chlorocarbonylmethyl - benzyl)-2-methylhydrazine, obtained as above, was dissolved in 50 ml. of absolute benzene and mixed in the cold, dropwise with a solution of 13.6 g. of isopropylamine in 100 ml. of absolute benzene. The temperature of the reaction mixture was maintained via cooling at a maximum of 20° during this mixing.

After the mixing was completed, the reaction mixture was stirred for 2 hours at 20° and then for 1 hour at 60°. Benzene and excess isopropylamine were then distilled off at 10 torr. The oily residue was partitioned between 200 ml. of water and 200 ml. of methylene chloride. The methylene chloride eluate was separated and the aqueous phase was extracted 3 times, each time with 100 ml. of methylene chloride. The combined methylene chloride eluates were successively washed with 50 ml. of 2 N hydrochloric acid, 50 ml. of water, 50 ml. of 2 N sodium hydroxide and then twice, each time with 50 ml. of water, dried with sodium sulfate and concentrated at 10 torr. The residual 1,2-bis(benzyloxycarbonyl)-1-[p-[(isopropylcarbamoyl)methyl]benzyl] - 2 - methylhydrazine was further processed without any further purification.

EXAMPLE 6

27 g. of 1,2-bis(benzyloxycarbonyl)-1-[p-[(β-hydroxyethylcarbamyl)methyl]benzyl] - 2 - methylhydrazine was dissolved in 300 ml. of absolute methanol. The solution was mixed with 10 g. of activate carbon, shaken for two hours at room temperature and filtered. The nearly colorless filtrate was hydrogenated after the addition of 3 g. of palladium carbon (5%) at room temperature and atmospheric pressure. After the adsorption of hydrogen had ceased, the catalyst was filtered off and washed with 30 ml. of methanol. To the combined methanolic filtrates, there was then added 10 ml. of 2 N methanolic hydrochloric acid, and the so-obtained mixture then concentrated at 10 torr. The crystalline 1-[p-[(β-hydroxyethylcarbamoyl)methyl]benzyl] - 2 - methylhydrazine hydrochloride after several recrystallizations from methanol/ether, formed colorless crystals melting at 123–125°.

The starting material used above in this example was prepared as follows:

27.7 g. of 1,2-bis(benzyloxycarbonyl)-1-(p-chlorocarbonylmethyl-benzyl)-2-methylhydrazine were dissolved in 70 ml. of absolute dioxane and, in the course of 15 minutes, added dropwise, with cooling and stirring, to a solution of 16.5 g. of ethanolamine in 50 ml. of absolute dioxane. The temperature of the reaction mixture was maintained at a maximum of 20° during this addition. The reaction mixture was then permitted to stand for 12 hours at room temperature and then heated with stirring for 1 hour at 60°. The dioxane was then distilled off at 10 torr. and the brown, oily residue was partitioned between 200 ml. of water and 200 ml. of ethyl acetate. The aqueous phase was separated and extracted anew with 200 ml. of ethyl acetate. The combined ethyl acetate eluates were washed with 100 ml. of 1 N hydrochloric acid, 100 ml. of water, 100 ml. of 2 N sodium hydroxide and then twice, each time with 100 ml. of water; dried with sodium sulfate and concentrated under reduced pressure, yielding 1,2 - bis(benzyloxycarbonyl)-1-[p-[(β-hydroxyethylcarbamoyl)methyl]benzyl]-2-methylhydrazine which was further processed without further purification.

EXAMPLE 7

23 g. of 1,2-bis(benzyloxycarbonyl)-1-[p-(allophanoylmethyl)benzyl] - 2-methylhydrazine was mixed with 150 ml. of a 33% solution of hydrogen bromide in glacial acetic acid, and with occasional agitation, permitted to stand for 16 hours at room temperature. The crystals which separated were then filtered off, washed with 100 ml. of glacial acetic acid and 200 ml. of ether and thrice recrystallized from methanol/water with the addition of a few drops of aqueous, concentrated hydrobromic acid, yielding 1-[p-(allophanoylmethyl)benzyl]-2-methyl-hydrazine hydrobromide, melting at 224° (dec.).

The starting material used above in this example was prepared as follows:

27.7 g. of 1,2-bis(benzyloxycarbonyl)-1-(p-chlorocarbonylmethyl-benzyl)-2-methylhydrazine was dissolved in 150 ml. of dioxane and, after the addition of 20 g. of urea, stirred for 16 hours at 85°. The dioxane was then distilled off at 10 torr. The residue was partitioned between 200 ml. of water and 200 ml. of ethyl acetate. The aqueous phase was separated and extracted with 200 ml. of ethyl acetate. The combined ethyl acetate eluates were twice washed with 100 ml. of water, then with 100 ml. of 2 N sodium hydroxide, and then once with 100 ml. of water, dried with sodium sulfate and concentrated at 10 torr. The residual 1,2 - bis(benzyloxycarbonyl)-1-[p-allophanoylmethyl)benzyl]-2-methyl hydrazine was further processed without further purification.

EXAMPLE 8

Capsules of the following composition were prepared as below.

| | Mg. |
|---|---|
| 1-[p - (carbamoylmethyl)benzyl]-2-methylhydrazine hydrobromide | 25 |
| Mannitol | 90 |
| Talc | 5 |
| | 120 |

The active ingredient was homogenized with the talc and mannitol, passed through a No. 5 sieve (mesh width about 0.23 mm.) and once again intermixed. It was then filled into No. 4 gelatin capsules.

EXAMPLE 9

Dragees of the following composition were prepared as below.

| Nucleus: | Mg. |
|---|---|
| 1-[p - [(isopropylcarbamoyl)methyl]benzyl]-2-methylhydrazine hydrochloride | 50 |
| Mannitol | 80 |
| Talc | 5 |
| Cornstarch | 15 |
| Nucleus weight | 150 |
| Coating: | |
| Sugar 90% / Rice starch 5% / Talc 5% | 150 |
| Nucleus weight | 150 |
| Coating weight | 150 |
| | 300 |

The active ingredient was mixed with the mannitol and passed through a No. 5 sieve (mesh width about 0.23 mm.). The cornstarch was heated with water to a 10% paste. The pulverized mixture was then granulated with this paste. The so-obtained slightly moist mass was then granulated by means of a No. 3 sieve (mesh width about 1.0 mm.) The granules were dried and then mixed with the talc. The so-obtained compressible mixture was then passed into biconvex kernels weighing 150 mg. each. The kernels had a diameter of approximately 8.0 mm. These kernels were then coated, using the conventional methods, with a sugar syrup to yield an end weight of 300 mg.

EXAMPLE 10

According to the procedure of Example 9, dragees of the following composition were prepared.

Nucleus: Mg.
1 - [p-[(β - hydroxyethylcarbamoyl)methyl]
benzyl]-2-methylhydrazine hydrochloride _ 25.0
Mannitol _____ 60.0
Talc _____ 5.0
Cornstarch _____ 10.0

Nucleus weight _____ 100.0

Coating:
Sugar 90%
Rice starch 5% }_____ 100.0
Talc 5%

End weight _____ 200.0

We claim:
1. A compound selected from the group consisting of compounds of the formulas

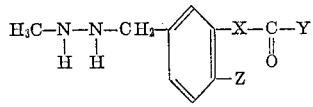

and

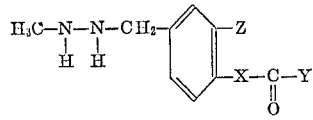

wherein X is a member selected from the group consisting of

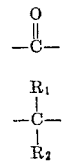

and

Y is selected from the group consisting of amino and lower alkylamino; Z is selected from the group consisting of hydrogen, ureido, trifluoromethyl, lower alkanoylamino, carbamoyl and lower alkylcarbamoyl; $R_1$ is selected from the group consisting of hydrogen, hydroxy, halo, lower alkyl and lower alkoxy; and $R_2$ is selected from the group consisting of hydrogen, halo, lower alkyl and lower alkoxy, and pharmaceutically acceptable acid addition salts thereof.

2. A compound in accordance with claim 1 wherein Z is hydrogen.

3. A compound in accordance with claim 2 wherein X is

4. A compound in accordance with claim 3 wherein $R_1$ and $R_2$ are hydrogen.

5. A compound in accordance with claim 4 wherein Y is lower alkylamino.

6. 1-[p-(carbamoylmethyl)benzyl] - 2 - methylhydrazine hydrobromide.

7. 1 - [p - [(isopropylcarbamoyl)methyl]benzyl] - 2-methylhydrazine hydrochloride.

8. 1 - [p - [(t. - butylcarbamoyl)methyl]benzyl] - 2-methylhydrazine hydrochloride.

References Cited

Chemical Abstracts, Volume 59, Columns 6313–6314, September 1963.

BERNARD HELFIN, Primary Examiner

M. W. GLYNN, Assistant Examiner

U.S. Cl. X.R.

260—471, 544, 559, 553, 465, 569, 518; 424—322, 324

PO-1050
(5/69)

UNITED STATES PATENT OFFICE
CERTIFICATE OF CORRECTION

Patent No. 3,459,799    Dated August 5, 1969

Inventor(s) HUGO GUTMANN et al.

It is certified that error appears in the above-identified patent and that said Letters Patent are hereby corrected as shown below:

Column 5, line 13, "or" should be:
(or

Column 6, line 10, "noyl-" should be:
noyl)-

Column 8, line 70, "zyl)-" should be:
zyl]-

Column 10, line 1 "only" should be:
onyl

Column 11, line 31, "ethylcarbamyl)" should be:
ethylcarbamoyl)

Column 12, line 20, "-[p-al-" should be:
-[p-(al-

SIGNED AND
SEALED
MAY 12 1970

(SEAL)
Attest:

Edward M. Fletcher, Jr.
Attesting Officer

WILLIAM E. SCHUYLER, JR.
Commissioner of Patents